US008045250B1

(12) United States Patent
Gross

(10) Patent No.: US 8,045,250 B1
(45) Date of Patent: Oct. 25, 2011

(54) OPTICAL SCANNING USING ROTATING PARALLEL PLATE

(75) Inventor: Kenneth P. Gross, San Carlos, CA (US)

(73) Assignee: KLA-Tencor Corporation, San Jose, CA (US)

( * ) Notice: Subject to any disclaimer, the term of this patent is extended or adjusted under 35 U.S.C. 154(b) by 458 days.

(21) Appl. No.: 12/273,466

(22) Filed: Nov. 18, 2008

(51) Int. Cl.
*G02B 26/08* (2006.01)
(52) U.S. Cl. ................................. 359/209.1
(58) Field of Classification Search .......... 359/197.1, 359/209.1; 356/622
See application file for complete search history.

(56) References Cited

U.S. PATENT DOCUMENTS 6,583,855 B2 * 6/2003 Krikke et al. .................. 355/67

* cited by examiner

*Primary Examiner* — Euncha Cherry
(74) *Attorney, Agent, or Firm* — Joshua D. Isenberg; JDI Patent

(57) ABSTRACT

A beam of incident light may be positioned on a target by directing the beam towards the target and transmitting the incident beam of light through one or more refractive plates having first and second parallel refracting surfaces in a path of the beam and adjusting an angular orientation of one or more refractive plates.

24 Claims, 2 Drawing Sheets

OPTICAL SCANNING USING ROTATING PARALLEL PLATE

FIELD OF INVENTION

The invention is directed to optical scanning using a rotating refractive plate. Embodiments of this invention relate optical instruments that use a scanning beam of light and more particularly to optical instruments in which small spot of light may be scanned across a sample using a rotating refractive plate.

BACKGROUND OF THE INVENTION

Many optical instruments used for localized optical metrology measurements of substrates including film thickness, critical dimensions (CD), overlay instruments, and the like, use a beam of light that impinges on the surface of a sample. These technologies are often used to perform measurements on a series of sample targets, or target arrays on the substrate of interest in order to take these metrology measurements. A key consideration for metrology systems used in production environments, such as semiconductor wafer fabrication is throughput, which refers to the number of samples that can be scanned per unit time. The throughput depends on the number of targets in a sample, the time to acquire each target, the time for measurement at each target and the time to move from one target to the next. The combined time for movement, acquisition and measurement is sometimes referred to as move-acquire-measure (MAM) time. It is desirable to decrease the MAM time in order to increase the throughput or to allow more targets to be measured without detrimentally affecting throughput.

Currently the most popular technique for implementing these metrology measurements include physically moving the substrate under the optical beam of light. These small, localized moves, on the order of 10-50 micrometers of translation, may be accomplished by using conventional stepping stages. However, the movement times are restricted to minimum response times of the stepping stages. These are typically in the neighborhood of 50 milliseconds due to mechanical and inertial limitations.

Another technique implemented for these metrology measurements includes the use of scanning mirrors as the active element of the scanning tool. In this technique, the sample remains more or less fixed and the mirror scans the incident beam from one target location to another. This approach, however, has several clear disadvantages. In particular, for very small scan translations, e.g., on the order of 10-50 micrometers, the angle adjustment required for these scanning mirrors is less than 1 milliradian. Therefore the intrinsic accuracy for repeatability and cross-axis motion is severely limited.

It would be desirable to be able to reduce the target-to-target, or cell-to-cell stepping times down to less then 5 milliseconds. By decreasing the stepping-time, one can obtain a large improvement in the overall MAM time of the measurement sequence. It is within this context that embodiments of the present invention arise.

DESCRIPTION OF THE SPECIFIC EMBODIMENTS

Embodiments of the present invention improve the movement, acquisition, and measurement time (MAM) by optically scanning the interrogating spot and quickly moving from target to target using one or more rotating refractive parallel plates. The use of a rotating refractive plate allows for large rotating plate movements that correspond to small scan translations. By increasing the minimum rotating plate movements required for small scan translations, it is possible to significantly improve the accuracy and repeatability of positioning of a beam of light on the surface of a target sample.

Figure 1A:
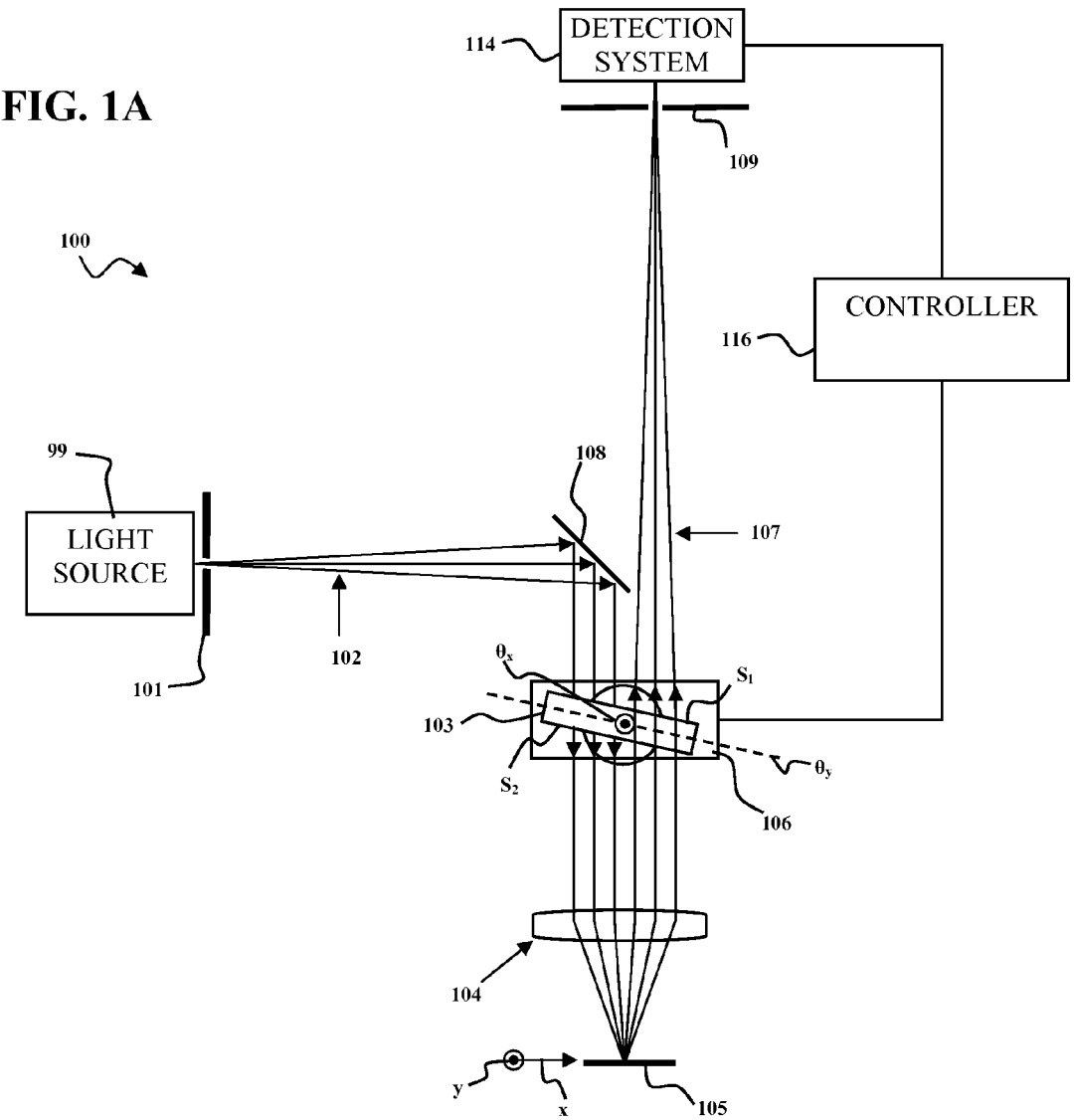
FIG. 1A is a schematic diagram of an optical apparatus according to an embodiment of the present invention.

As seen in FIG. 1A, an optical apparatus 100 according to an embodiment of the present invention may comprise a source aperture 101, a mirror 108, a rotating parallel plate 103 controlled by an actuator system 106, a focusing objective 104, and a detector aperture 109. A beam of light 102 from a source 99 is transmitted through the source aperture 101 to the mirror 108. As used herein, the term "light" refers to electromagnetic radiation in a frequency from the infrared through the ultraviolet, including the infrared, visible and ultraviolet portions of the electromagnetic spectrum. The beam of light 102 may be polarized or unpolarized, monochromatic or polychromatic.

The mirror 108 directs the incident beam 102 of light towards a target 105. Before reaching the target 105, the incident beam 102 passes through a refractive rotating parallel plate 103 and a focusing objective 104 located between the rotating parallel plate 103 and the substrate 105. The focusing objective 104 focuses the incident beam into an interrogating spot on the target 105. The parallel plate 103 is generally transparent to the light in the incident beam 102. The parallel plate 103 deflects the incident beam through refraction and first and second parallel surfaces $S_1$, $S_2$ that lie along the path of the incident beam 102. By rotating the parallel plate 103 the path of the incident beam 102 may be shifted slightly thereby shifting the location of the interrogating spot where the incident beam 102 impinges on the target 105.

After the incident beam 102 interacts with the target 105 it is reflected as an outgoing beam 107, which passes back through the focusing objective 104 and the rotating parallel plate 103 before arriving at a detector aperture 109 of a detection system 114. Because the rotating parallel plate 103 acts as a double-pass mechanism, the beam deviation and chromatic aberration experienced by the incident beam 102 in passing through the rotating parallel plate 103 may be negated at the detector aperture 109 when the outgoing beam 107 passes through the refractive plate 103 on its way to the detector aperture 109.

The use of a rotating parallel plate 103 controlled by a rotational actuator system 106 allows for the optical apparatus 100 to optically move the interrogating spot quickly and accurately from one location to another on the target 105. Because the parallel plate 103 deflects the incident beam by way of refraction as opposed to reflection, the deflection of the incident and outgoing beams is essentially a lateral shift of the beam path as opposed to an angular deflection, as is the case with a rotating mirror. The amount of lateral shift depends on the angle between the incident beam of light and the normal to the plane of the plate 103, the index of refraction of the plate and the thickness of the plate. Consequently, the amount of beam deflection per unit angle of rotation of the parallel plate 103 is relatively small compared to that for a rotating mirror. This allows the refractive plate 103 to be located a relatively large distance from the target 105. The relatively small amount of lateral shift per unit of angular rotation of the plate 103 means that a relatively small amount of lateral shift may be made as a result of a relatively large angular displacement of the refractive plate while maintaining a high degree of precision in beam positioning at the target.

The parallel plate 103 may be made from any material that is transparent for the relevant wavelength range of the incident beam 102. For example, nearly any optically transparent material, e.g., glass, quartz, or plastic may be used if the relevant wavelength range is in the visible portion of the electromagnetic spectrum and portions of the infrared and ultraviolet that lie close to the visible portion. For incident light in the deep ultraviolet range, the parallel plate 103 may be made of material that is transparent in that wavelength range, such as magnesium fluoride.

In the non-limiting example depicted in FIG. 1A, the actuator system 106 controls the rotation of the parallel plate 103 about first and second orthogonal rotational axes $\theta_x$, $\theta_y$. In FIG. 1A, the $\theta_x$ axis is perpendicular to the plane of the drawing and the $\theta_y$ lies in the plane of the drawing. Rotation of the plate 103 about the $\theta_x$ axis shifts the interrogation spot along the target in a direction indicated by x in FIG. 1A. Rotation of the plate 103 about the $\theta_y$ axis shifts the interrogation spot along the target in a y direction that is orthogonal to the x direction. The orientation of the rotational axes $\theta_x$, $\theta_y$ is not limited to the particular configuration depicted in FIG. 1A. In general, the notation $\theta_x$ is intended to signify the axis about which the plate 103 rotates to produce a lateral displacement of the beam along the x axis at the target. Similarly, the notation $\theta_y$ is intended to signify the axis about which the plate 103 rotates to produce a lateral displacement of the beam along a y-axis that is perpendicular to the x axis at the target.

Figure 1B:
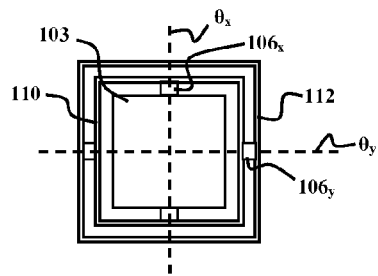
FIG. 1B is a schematic diagram of a rotating parallel plate scanner used in the apparatus of FIG. 1A.

FIG. 1B illustrates a non-limiting example of a possible configuration of the parallel plate 103 and rotational actuator system 106 to implement the rotation about the $\theta_x$ and $\theta_y$ axes. The configuration depicted in FIG. 1B is sometimes referred to as a gimbal mount or gimbal. In this configuration, the refractive plate 103 is rotatably mounted to an inner frame 110 and the inner frame 110 is rotatably mounted to an outer frame 112. By way of example, but not by way of limitation, one or more rotational actuators $106_x$ may exert rotational influence on the plate 103 to rotate the plate with respect to the inner frame 110 about the $\theta_x$ axis. In a like manner, one or more rotational actuators $106_y$ may exert rotational influence on the inner frame 110 to rotate the inner frame and the refractive plate 103 with respect to the outer frame 112 about the $\theta_y$ axis. The rotational actuators $106_x$, $106_y$ may be any suitable type of device capable of imparting rotational motion to the plate 103. Examples of suitable devices include, but are not limited to, galvanometer actuators, microelectromechanical system (MEMS) actuators, piezoelectric actuators, or stepper motors.

There are a number of practical considerations to take into account in selecting a rotational actuator system for rotating the refractive plate 103. Specifically, it is desirable for the rotational actuator(s) to rotate the plate fast enough from one angular orientation to another. The scanning time $t_s$ from one angular orientation to another may be estimated according to:

$$t_s = 2\sqrt{\frac{I\beta}{T}},$$

where I is the rotational inertia of the actuator rotor and plate 103, β is the angular displacement, and T is the torque exerted by the rotational actuator.

Furthermore, it is desirable for the actuators to have a settling time that is sufficiently low that it does not unacceptably increase the MAM time. As used herein, settling time refers to the time it takes after rotational movement for the orientation of the plate 103 to stabilize sufficiently for an accurate measurement. In addition, it is desirable for errors in positioning of the interrogation spot to be small compared to the scan increment.

In embodiments of the invention, the rotational actuator system 106 may be controlled by an electronic controller 116. By way of example, but not by way of limitation, the controller 116 may be implemented in the form of a general purpose computer programmed to implement scanning of the interrogation spot with respect to the target 105. Furthermore, the controller 116 may be coupled to the detection system 114 and may be programmed or otherwise configured to control both beam scanning and measurement acquisition and analysis.

The detection system 114 may measure any property of interest of the reflected light 107. In general, the detection system 114 may include a detector that receives the reflected light 107, or a portion thereof, and generates an electronic signal that is related in some way to the property of interest. Examples of properties of interest include the intensity of the reflected light, the wavelength of the reflected light and the polarization of the reflected light. The detection system 114 may include any type of optical detector used for measurement of such properties. An example of a detector that produces a signal related to the intensity of light is a charge coupled device (CCD). The detection system may include other optical components, such as a polarizer or monochromator to select a particular polarization or wavelength of the reflected light 107.

Figure 2A:
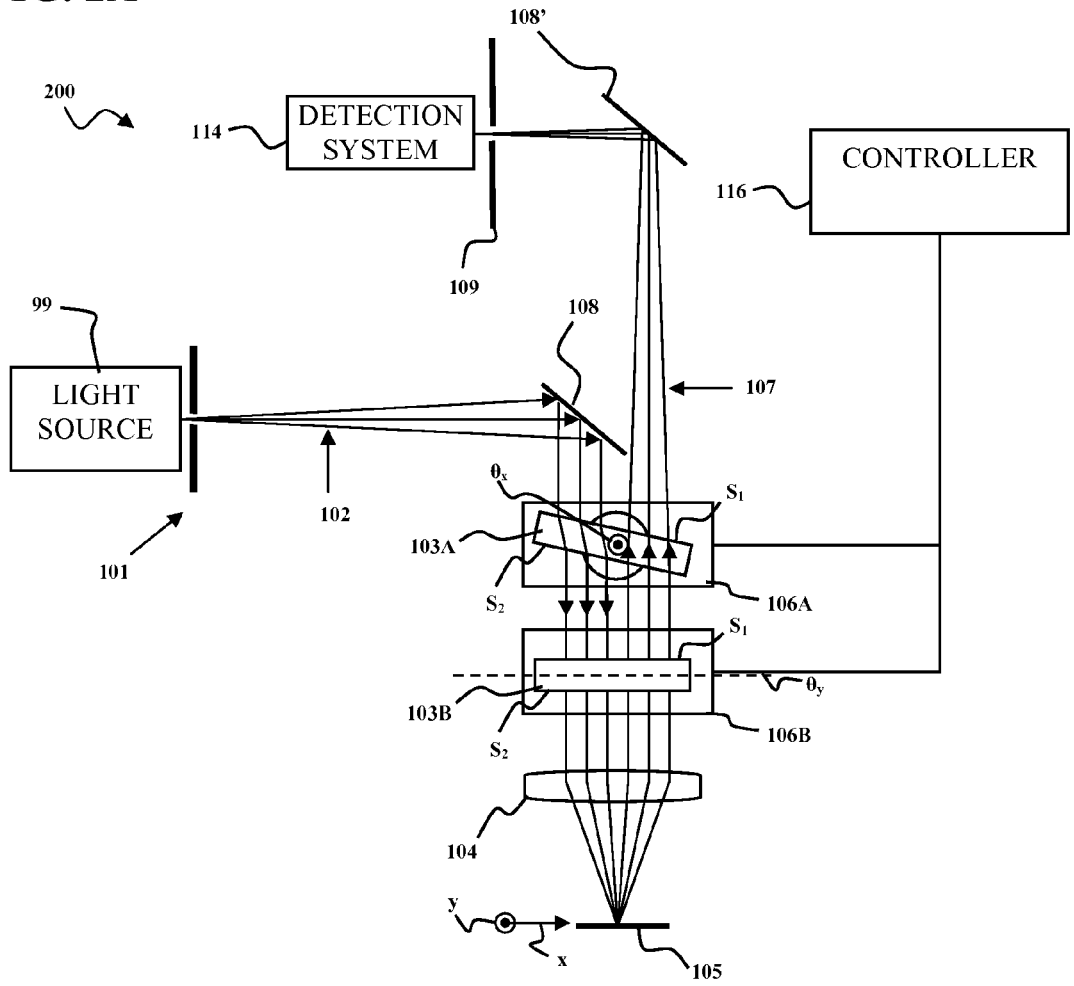
FIG. 2A is a schematic diagram of an optical apparatus according to an alternative embodiment of the present invention.
Figure 2B:
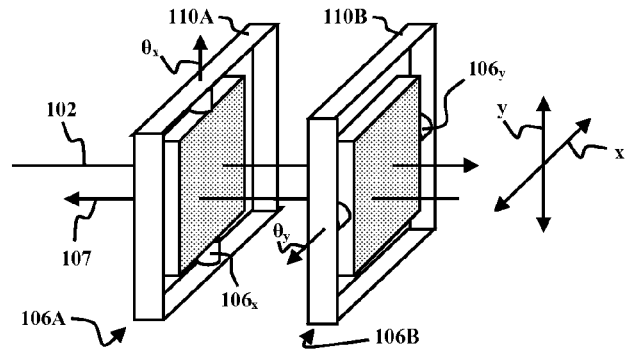
FIG. 2B is a schematic diagram of a rotating parallel plate scanner used in the apparatus of FIG. 2A.

Embodiments of the present invention are not limited to the scanning configuration shown in FIG. 1A and FIG. 1B. For example, in an alternative embodiment illustrated in FIG. 2A and FIG. 2B, an optical apparatus 200 similar to the apparatus 100 of FIG. 1A utilizes two rotating plates 103A, 103B and two corresponding actuator systems 106A, 106B. Each plate 103A, 103B may have first and second parallel surfaces that lie along the paths of the incident beam of light 102 and outgoing light 107. The rotational actuator systems 106A, 106B may include any type of actuator to impart rotational influence to the plates 103A, 103B, including galvanometer actuators, MEMS actuators, piezoelectric actuators and stepper motors. By way of example, as seen in FIG. 2B, one actuator system 106A may include a frame 110A and rotational actuator $106_x$. Plate 103A and actuator system 106A are configured to rotate the plate 103A about a $\theta_x$ axis with respect to the frame 110A to position the incident beam 102 along an x axis at the target 105. The other actuator system 106B may similarly include a frame 110B and a rotational actuator $106_y$ configured to rotate the plate 103B about a $\theta_y$ axis with respect to the frame 110B to position the incident beam 102 along a y axis at the target 105. The control 116 may be coupled to the actuators $106_x$, $106_y$ to independently control the rotation of the refractive plates 103A, 103B about different axes of rotation.

Other variations on the embodiments described above are possible. For example, the mirror 108 may be configured to rotate about one or more axes to deflect the incident beam 102. Such deflection may be used for large scale or coarse positioning of the interrogation spot of the incident beam 102 on the target 105. Rotation of the refractive plate 103 in the system of FIG. 1A or the plates 103A, 103B in the system of FIG. 2A may be used for fine positioning of the incident beam 102 on the target 105. For this case of large angular deflection with input mirror 108, the apparatus 200 may include a compensating mirror 108' in the path of the outgoing beam between the target 105 and the detection system 114. The compensating mirror 108' may be rotated to keep the outgoing beam positioned on the aperture 109 of the detection system 114.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for positioning a beam of light on a target, comprising:
   a) directing an incident beam of light towards the target;
   b) positioning said incident beam of light at an interrogating spot on said target transmitting the incident beam of light through one or more refractive plates having first and second parallel refracting surfaces in a path of said incident beam of light and adjusting an angular orientation of one or more refractive plates; and
   c) detecting reflected and/or scattered light produced from an interaction between said incident beam of light and said target at said interrogating spot with a detection system.

2. The method described in claim 1, wherein a) includes directing the incident beam of light from a monochromatic light source towards the target.

3. The method described in claim 1, wherein a) includes directing the incident beam of light from a broadband light source towards the target.

4. The method described in claim 1, wherein a) includes directing an incident beam of light towards the target with one or more mirrors.

5. The method of claim 4 wherein a) includes performing a coarse position adjustment of the interrogating spot on the target by rotating the one or more mirrors about one or more axes and wherein b) includes performing a fine adjustment of the interrogating spot on the target by rotating the refractive plate about one or more axes.

6. The method described in claim 1, wherein a) includes focusing the light onto the interrogating spot with a focusing objective.

7. The method described in claim 1, wherein b) includes positioning the incident beam of light to the interrogating spot on the target through the adjustment of an angular orientation of the one or more refractive plates with a one or more galvanometer actuators, microelectromechanical system (MEMS) actuators, piezoelectric actuators, or stepper motors.

8. The method described in claim 1, wherein b) includes positioning the incident beam of light to the interrogating spot on the target through the adjustment of a single refractive plate in the path of said incident beam of light, wherein the single refractive plate is configured to rotate about first and second rotation axes to position the incident beam on the target with respect to two different orthogonal or non-orthogonal directions.

9. The method described in claim 1, wherein b) includes positioning the incident beam of light to the interrogating spot on the target through the adjustment of two refractive plates in the path of said incident beam of light, wherein each refractive plate is configured to rotate about a different one of two rotation axes to position the incident beam on the target with respect to a corresponding one of two different directions.

10. The method of claim 1, further comprising:
    d) repeating steps (a)-(c) with respect to one or more spots of interest on said target.

11. The method of claim 1 wherein c) includes transmitting reflected or diffracted light from an interaction between the interrogating spot on the target and the incident beam of light back through the one or more refractive plates to a detection system.

12. An apparatus for positioning a beam of light on a target, comprising:
    a) a source aperture configured to transmit a beam of incident light;
    b) one or more rotating refractive plates disposed in a path of the beam of incident light between the source aperture and the target, wherein the one or more refractive plates are configured to transmit the beam of incident light, wherein each refractive plate includes first and second parallel refracting surfaces in a path of said incident beam of light, and wherein the one or more refractive plates are configured to position said beam of incident light at an interrogating spot on the target by adjusting an angular orientation of one or more refractive plates;
    c) a detector aperture configured to transmit reflected or diffracted light resulting from interaction between said beam of incident light and said interrogating spot on said target.

13. The apparatus of claim 12 wherein the one or more refractive plates are configured to rotate about one or more axes.

14. The apparatus of claim 13, further comprising one or more rotational actuators configured to impart rotational movement to the one or more refractive plates about the one or more axes.

15. The apparatus of claim 14, wherein the one or more rotational actuators include an actuator selected from the group of microelectromechanical system (MEMS) actuators, galvanometer actuators, piezoelectric actuators, and stepper motors.

16. The apparatus of claim 12, further comprising one or more mirrors positioned along a path of said incident light between said source aperture and said one or more rotating refractive plates, wherein said one or more mirrors are configured to direct the incident beam of light towards the one or more rotating refractive plates.

17. The apparatus of claim 12, further comprising a focusing objective located along a path of said beam of light, wherein the focusing objective is configured to focus the incident beam of light towards the interrogating spot on the target.

18. The apparatus of claim 12, wherein the one or more rotating refractive plates includes a single rotating refractive plate, each plate having first and second parallel refractive surfaces disposed along a path of the incident beam of light, wherein the single refractive plate is configured to rotate about first and second rotation axes to position the incident beam on the target with respect to two different directions.

19. The apparatus of claim 12, wherein the one or more rotating refractive plates includes two rotating refractive plates, each plate having first and second parallel refractive surfaces disposed along a path of the incident beam of light, wherein each refractive plate is configured to rotate about a different one of two rotation axes to position the incident beam on the target with respect to a corresponding one of two different directions.

20. The apparatus of claim 12 wherein the detector aperture and one or more refractive plates are configured such that a path of the reflected or diffracted light from the interrogating spot to the detector aperture passes back through the one or more refractive plates.

21. The apparatus of claim 12, further comprising a first mirror disposed along an optical path between the source aperture and the one or more refractive plates and a second mirror disposed along an optical path between the target and the detector.

22. The apparatus of claim 21 wherein the first mirror is configured to rotate about one or more axes to provide a coarse position adjustment of the interrogating spot on the target.

23. The apparatus of claim 21 wherein the second mirror is configured to rotate about one or more axes in a way that compensates for rotation of the first mirror such that the light reflected or diffracted from the target is centered on an aperture of the detector.

24. An optical system, comprising:
a) a source of light;
b) a source aperture located proximate the source of light, wherein the source aperture is configured to transmit a beam of incident light generated by the source;
c) one or more rotating refractive plates disposed in a path of the beam of incident light between the source aperture and the target, wherein the one or more refractive plates are configured to transmit the beam of incident light, wherein each refractive plate includes first and second parallel refracting surfaces in a path of said incident beam of light, and wherein the one or more refractive plates are configured to position said beam of incident light at an interrogating spot on the target by adjusting an angular orientation of one or more refractive plates;
d) a detector aperture configured to transmit reflected light resulting from interaction between said beam of incident light and said interrogating spot on said target; and
e) a detector located proximate the detector aperture, wherein the detector is configured to receive the reflected light.

* * * * *